United States Patent
Jeong et al.

(10) Patent No.: US 7,499,228 B2
(45) Date of Patent: Mar. 3, 2009

(54) LENS FOR UNIFORMLY DISTRIBUTING LIGHT AND OPTICAL EMITTING DEVICE USING THE SAME

(75) Inventors: Young June Jeong, Kyungki-do (KR); Seog Ho Lim, Kyungki-do (KR); Bum Jin Kim, Kyungki-do (KR); Sung Min Yang, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 66 days.

(21) Appl. No.: 11/599,269

(22) Filed: Nov. 15, 2006

(65) Prior Publication Data
US 2007/0109952 A1    May 17, 2007

(30) Foreign Application Priority Data
Nov. 15, 2005    (KR) ...................... 10-2005-0109031

(51) Int. Cl.
*G02B 13/18* (2006.01)
(52) U.S. Cl. .................. 359/708; 359/642; 362/800
(58) Field of Classification Search ................. 359/642, 359/664, 708, 721; 362/800
See application file for complete search history.

(56) References Cited

U.S. PATENT DOCUMENTS 4,907,044 A    3/1990    Schellhorn et al.
5,408,395 A    4/1995    Schmid et al.
2002/0085390 A1*    7/2002    Kiyomoto et al. ............ 362/555
2003/0197956 A1*    10/2003    Yamakawa ................... 359/738

FOREIGN PATENT DOCUMENTS

| JP | SHO 61-063712 | 4/1986 |
| JP | 06-275106 A | 9/1994 |
| JP | 2002-094129 A | 3/2002 |
| JP | 2004-271880 | 9/2004 |
| JP | 2006-196459 A | 7/2006 |

OTHER PUBLICATIONS

Japanese Office Action, with English translation there of, issued in Patent Application No. JP 2006-308995 dated on Jul. 1, 2008.
Japanese Office Action, w/English translation thereof, issued in Japanese Patent Application No. JP 2006-308995 dated on Dec. 2, 2008.

* cited by examiner

*Primary Examiner*—Darryl J Collins
(74) *Attorney, Agent, or Firm*—McDermott Will & Emery LLP

(57) ABSTRACT

A lens includes a convex surface formed in an outer surface thereof facing away from a light source to uniformly distribute light emitted from the light source; a concave surface concaved inward from an inner region of the convex surface, around an optical axis; and a convex portion convexed outward from a central region of the concave surface, which the optical axis intersects, in order to enhance quantity of light around the optical axis. The lens refracts light beams falling onto the respective areas thereof at different angles, thereby producing a uniform light distribution within a specific lighting range, but does not create a dark area around an optical axis.

12 Claims, 5 Drawing Sheets

LENS FOR UNIFORMLY DISTRIBUTING LIGHT AND OPTICAL EMITTING DEVICE USING THE SAME

CLAIM OF PRIORITY

This application claims the benefit of Korean Patent Application No. 2005-109031 filed on Nov. 15, 2005, in the Korean Intellectual Property Office, the disclosure of which is incorporated herein by reference.

BACKGROUND OF THE INVENTION

1. Field of the Invention

The present invention relates to a lens for uniformly distributing light emitted from a light source and a light emitting device using the same. More particularly, the lens of the invention has a concave area in an outer surface thereof, formed around the optical axis, and a protrusion in a central portion of the concave surface in order to prevent a dark area.

2. Description of the Related Art

In general, a light emitting device is provided with a lens configured to distribute light emitted from a light source within a specific range. In the lens, an outer surface thereof facing away from the light source is curved convexly.

With the outer surface of the lens curved convexly, light emitted from the light source is refracted at a specific angle while it is passing through the lens to produce a light distribution range desirable to a user. However, such a lens structure has a drawback in that light concentrates on a central region of the lens around the optical axis and thereby produces an irregular light distribution.

To solve such a drawback, a light emitting device was proposed, which has a lens configured to distribute light passing around the optical axis in a wide range.

Such a convention light emitting device will now be described in detail with reference to FIGS. 1 and 2.

FIG. 1 is a vertical cross-sectional view illustrating a conventional light emitting device, and FIG. 2 is a cross-sectional view illustrating a lens of the light emitting device shown in FIG. 1.

Referring to FIG. 1, the conventional light emitting device includes a Light Emitting Diode (LED) package base 10, an LED 20 seated on an upper area of the LED package base 10 to act as a light source and a lens 30 attached to the top end of the LED package base 10 to cover the LED 20.

The LED 20 seated on the LED package base 10 emits light beams upward, i.e., toward the underside of the lens 30, which is oriented with its vertical central line aligned with the optical axis of the LED 20. The lens 30 is configured to refract the light beams emitted from the LED 20 at a specific angle so that the light beams are distributed within a specific range. Here, a convex surface 32 is formed on an outer surface of the lens 30 facing away from the LED 20, and a concave surface 34 is formed in a central portion of the convex surface 32. In a case where the convex surface 32 is formed on the entire upper surface of the lens 30, the light beams radiated from the LED 20 to the outside are concentrated around the optical axis, thereby failing to produce a uniform distribution. However, with the concave surface 34 formed in the upper central portion of the lens 30 which the optical axis intersects, the light beams diverge wide to lower brightness around the optical axis when they pass around the optical axis, thereby distributing uniformly.

In addition, the lens 30 adopted in the conventional light emitting device is so configured that the convex surface 32 has radii of curvature of 4.5 mm and 1.6 mm and the concave surface 34 has a radius of curvature of 0.6 mm as shown in FIG. 2. The concave surface 34 also has a convexed geometry in a peripheral portion connected to the convex surface 32 in order not to leave a boundary between the convex surface 32 and the concave surface 34. The convexed geometry of the concave surface 34 has a radius of curvature of 3.3 mm.

Here, the curvatures of the lens 30 shown in FIG. 2 may be varied according to the size of the lens 30. In addition, the angle of light beams refracted by the convex surface 32 and the concave surface 34 is determined by the radius of curvature of the convex surface 32 and the concave surface 34 so that the user can suitably select the radius of curvature of the convex and concave surfaces 32 and 34 according to the usage of the light emitting device.

As described above, the lens 30 of the conventional light emitting device can uniformly distribute the light beams emitted from the LED 20 since the entire upper surface of the lens 30 is composed of curved regions without any boundaries between the regions.

However, with the conventional lens 30 of the afore-mentioned structure, light passing through the concave surface 34 is dispersed laterally thereby preventing a dark area around the optical axis.

In a case where the conventional light emitting device having the dark area is used for the purpose of lighting, light illuminated to a spot desired by a user leaves a relatively dark central area. This makes it inconvenient to use the conventional light emitting device for the lighting. In addition, where the conventional light emitting device is used for a display unit, it does not provide a bright display when seen from the front.

SUMMARY OF THE INVENTION

The present invention has been made to solve the foregoing problems of the prior art and therefore an object of certain embodiments of the present invention is to provide a lens configured to uniformly distribute light so that light is not concentrated on a central area of a lighting range or a dark area does not take place around an optical axis.

According to an aspect of the invention for realizing the object, the invention provides a lens. The lens includes a convex surface formed in an outer surface thereof facing away from a light source to uniformly distribute light emitted from the light source; a concave surface concaved inward from an inner region of the convex surface, around an optical axis; and a convex portion convexed outward from a central region of the concave surface, which the optical axis intersects, in order to enhance quantity of light around the optical axis.

Preferably, the convex portion may comprise a spherical geometry.

Preferably, the convex portion may have a diameter corresponding to 10% to 50% of that of the concave surface.

Alternatively, the convex portion may have a diameter corresponding to 2% to 20% of that of the lens.

Alternatively, the convex portion may have a focal length corresponding to 50% to 500% of a radius of curvature thereof.

Preferably, the convex portion has a peripheral region connected to the concave surface, the peripheral region having a radius of curvature in a concave direction in order not to form a boundary between the convex portion and the concave surface.

According to another aspect of the invention for realizing the object, the invention provides a light emitting device. The light emitting device includes an LED package base where an LED is seated to act as a light source; and a lens as described just above, wherein the lens is attached to the LED package base to cover the light emitting diode.

Preferably, the lens may comprise a planar geometry in a surface facing the light emitting diode.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The following detailed description will present embodiments of a lens and a light emitting device using the same according to the invention with reference to the accompanying drawings.

Figure 1:
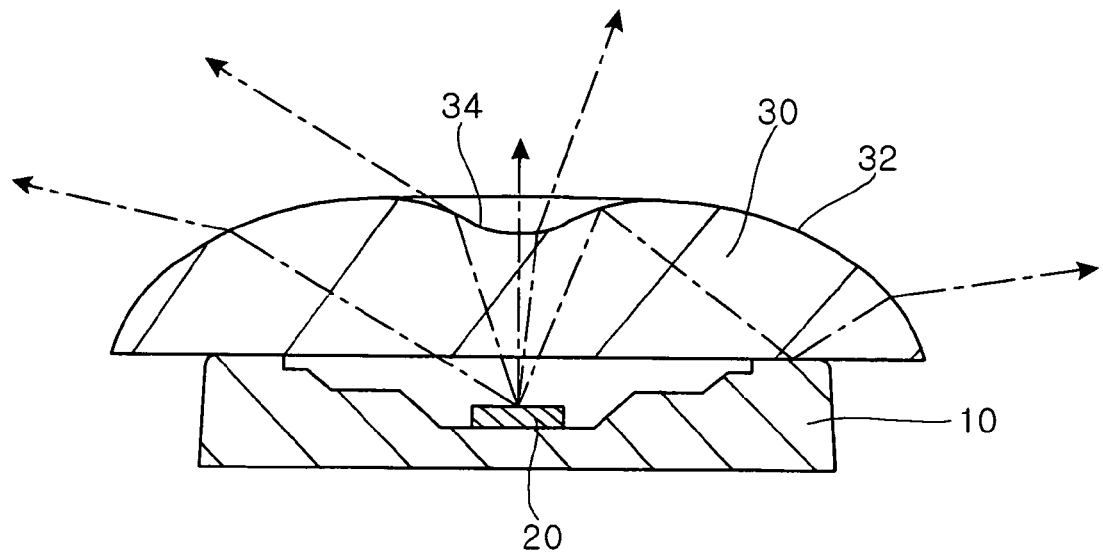
FIG. 1 is a vertical cross-sectional view illustrating a conventional light emitting device.
Figure 2:
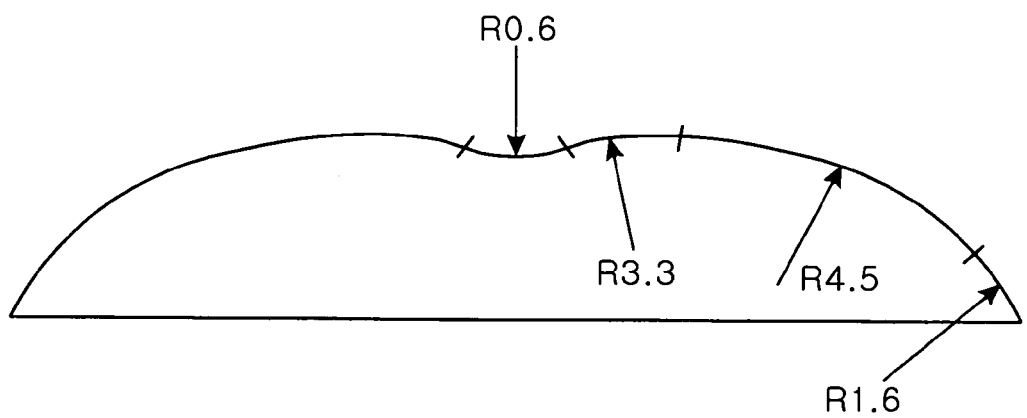
FIG. 2 is a cross-sectional view illustrating a lens of the light emitting device shown in FIG. 1.
Figure 3:
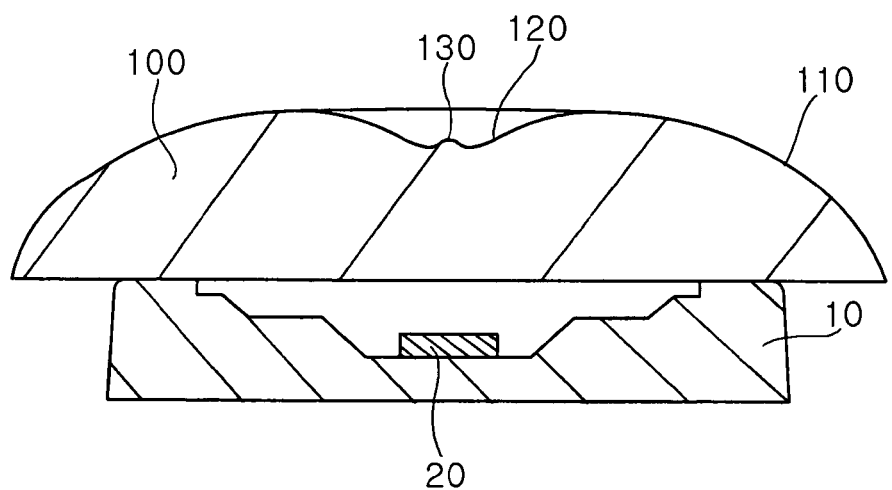
FIG. 3 is a vertical cross-sectional view illustrating a light emitting device of the invention.
Figure 4:
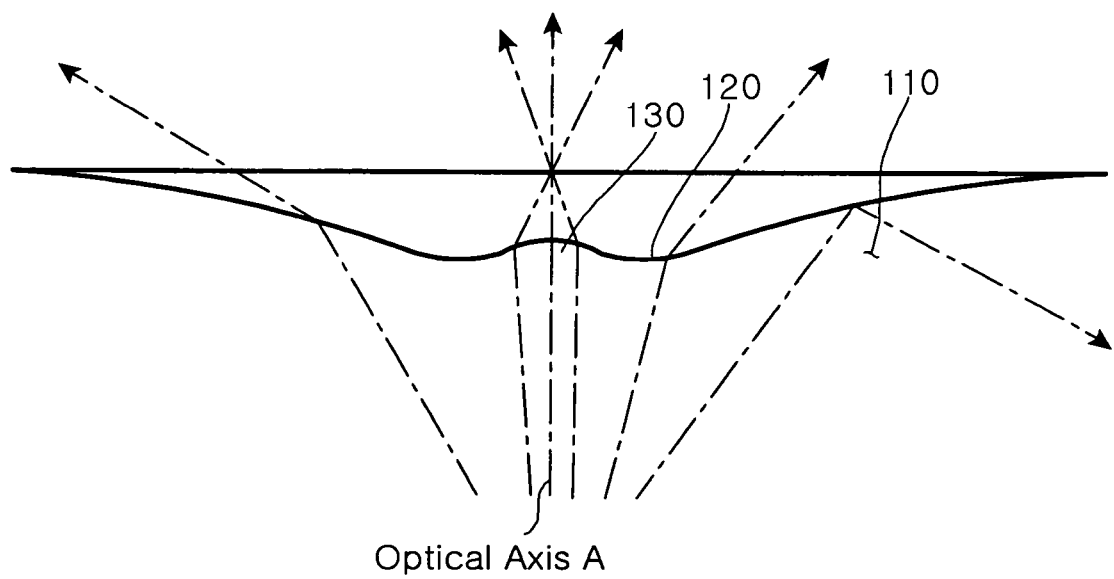
FIG. 4 is a cross-sectional view illustrating a specific part of a lens of the invention.

Referring to FIGS. 3 and 4, FIG. 3 is a vertical cross-sectional view illustrating a light emitting device of the invention, and FIG. 4 is a cross-sectional view illustrating a specific part of a lens of the invention.

As shown in FIG. 3, the light emitting device of the invention includes an LED 20 acting as a light source, an LED package base 10 where the LED 20 is seated and a lens 100 attached to the LED package base 10 to cover the LED 20.

The LED package base 10 has a concave geometry in an upper portion where the LED 20 is seated so that a slanted side wall of a recess of the LED package base 10 directs light beams emitted from the LED 20 toward the lens 100.

The operation and configuration of the LED 20 and the LED package base 10 are substantially the same as those of the LED 20 and the LED package base 10 of the conventional light emitting device, and thus will not be described in detail.

While this embodiment is described with reference to the LED 20 adopted as a light source, various types of light sources can be adopted in the light emitting device of the invention and the lens of the invention can be used to refract light emitted from the various types of light sources.

The lens 100 has a convex surface 110 formed in an upper outer surface thereof facing away from the light source to uniformly distribute light beams emitted from the light source. A concave surface 120 is formed around an optical axis A and recessed inward from an inner region of the convex surface 110. A convex portion 130 is convexed outward from a central region of the concave surface 120, which the optical axis A intersects, in order to enhance quantity of light around the optical axis A. In addition, the lens 100 preferably has a planar geometry in an inner surface thereof, which faces the light source, in order not to irregularly refract the light beams when the beams are introduced into the lens 100 from the LED 20.

The light beams 20 emitted from the LED 20 fall onto the convex surface 120, the concave surface 120 and the convex potion of the lens 100, which refract the light beams according to radii of curvature thereof and then radiate the refracted light beams upward. The convex surface 110 refracts light emitted from the LED 20 to be distributed within a specific range, and the concave surface 120 refracts light emitted from the LED 20 to disperse, that is, not to concentrate around the optical axis A.

Here, without the convex portion 130, the concave surface 120 formed in the central region of the convex surface 110 will disperse light thereby creating a dark area around the optical axis A. Thus, the convex portion 130 is formed in the central region of the concave surface 120 to refract and collect light which passes through the lens 100 around the optical axis A.

With the convex portion 130, the light beams propagating around the optical axis A are concentrated to enhance the quantity of light around the optical axis A, thereby preventing any dark area around the optical axis A.

The convex portion 130 may be formed entirely of a spherical geometry to uniformly refract the light beams propagating around the optical axis as shown in this embodiment. Alternatively, the convex portion may be formed partially of a spherical geometry to refract light which propagates around the optical axis at a specific angle. Such a geometry of the convex portion 130 may be modified freely according to user selection.

In addition, the convex portion 130 with an excessively small size may insignificantly enhance quantity of light, failing to prevent the dark area. On the other hand, the convex portion with an excessively large size may accordingly decrease light dispersion by the concave surface 120. This as a result cause light to concentrate around the optical axis, thereby producing an irregular overall light distribution. Accordingly, the convex portion 130 has a diameter preferably in the range from 10% to 50% of that of the concave surface 120.

In addition, when compared with the diameter of the lens 100, the diameter of the convex portion 130 may be set to be 2% to 20% of that of the lens 100.

In a case where the convex portion 130 has a longer focal length, the convex portion 130 acts as a magnifier, thereby concentrating the light beams around the optical axis A. The light beams concentrated around the optical axis A make an irregular light distribution. Thus, the convex portion 130 preferably has a shorter focal length so that the light beams propagating through a periphery of the convex portion 130 radiate upward without having to concentrate around the optical axis when the light beams intersect the upper surface of the lens 100. As shown in FIG. 4, the light beams refracted through the periphery of the convex portion 130 intersect each other and are radiated upward, which otherwise are excessively concentrated around the optical axis forming dark areas.

In a case where the convex portion 130 has an excessively short focal length, light refracted by the convex portion 130 spreads in a wide angle after passing beyond the focus, thereby degrading an effect of enhancing the quantity of light around the optical axis.

As a result, the focal length of the convex portion 130 should be set within a specific range. Unlike the solar light in which parallel light beams fall onto the respective areas, the lens of the invention receives radially diverging light beams from the LED 20. Accordingly, the focal length of the convex portion 130 may be modified variously according to the distance to and the size of the light source such as the LED 20 rather than determined to a specific value according to the radius of curvature of the convex portion 130. Accordingly, the focal length of the convex portion 130 adopted in the invention is set preferably with reference to the radius of curvature of the convex portion 130, and more preferably, in the range of 50% to 500% of the radius of curvature of the convex portion 130.

Figure 5:
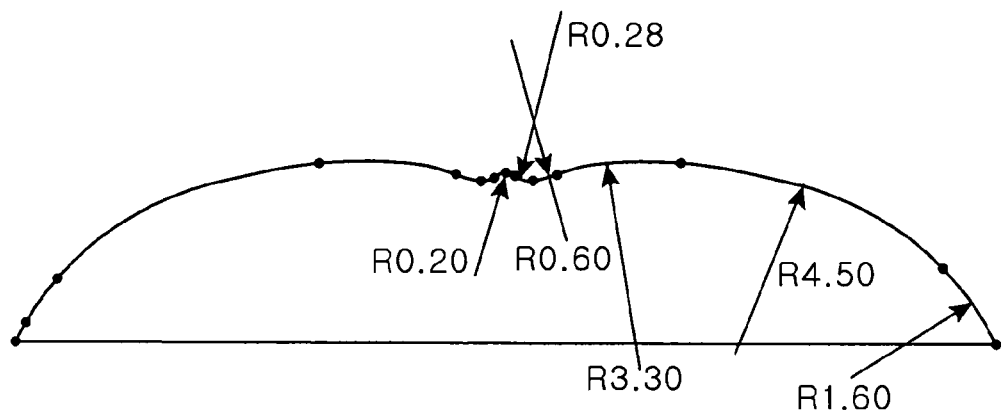
FIG. 5 is a cross-sectional view illustrating dimensions of individual parts of the lens of the invention.

FIG. 5 is a cross-sectional view illustrating dimensions of individual parts of the lens of the invention.

Referring to FIG. 5, the lens 100 of the invention is configured so that the convex surface has a radius of curvature of 4.5 mm to 1.6 mm, the convex surface 120 has a radius of curvature of 0.6 mm, and the convex portion 130 has a radius of curvature of 0.2 mm.

If a boundary is formed between the convex surface 110 and the concave surface 120 or between the concave surface 120 and the convex portion 130, light emitted from the LED 20 is concentrated or irregularly refracted on the boundary, thereby producing an irregular light distribution.

To solve such problems, a peripheral region of the concave surface 120 connected to the convex surface 110 is convexed outward with a radius of curvature of 3.3 mm to avoid a boundary between the convex surface 110 and the concave surface 120 while a peripheral region of the convex portion 130 connected to the concave surface 120 is concaved inward with a radius of curvature of 0.28 mm to avoid a boundary between the concave surface 120 and the convex surface 130.

Accordingly, in the lens 100 of the invention, even though the respective areas including the convex surface 110, the concave surface 120 and the convex portion 130 have different radii of curvature, there are no boundaries between the respective areas so that light emitted from the LED 20 is not concentrated or irregularly refracted on a specific region and thereby more uniformly distributed.

The radii of curvature of the respective areas of the lens 100 are not limited to those illustrated in FIG. 5 but may be modified variously according to the sizes and usages of the lens 100.

Figure 6:
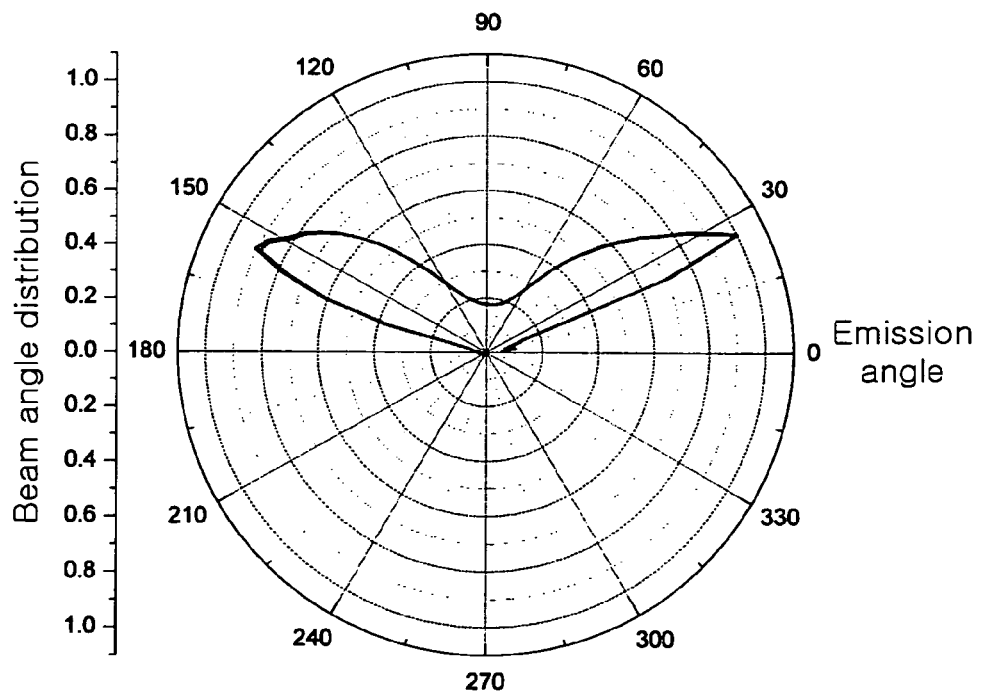
FIG. 6 is a graph illustrating a beam angle distribution of a conventional light emitting device.
Figure 7:
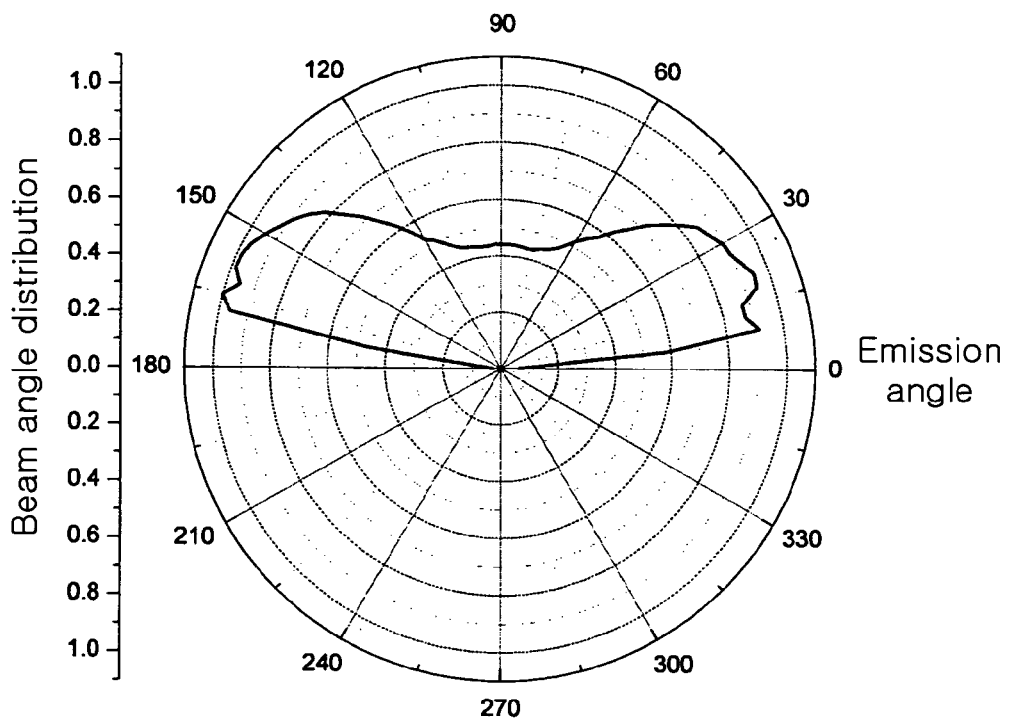
FIG. 7 is a graph illustrating a beam angle distribution of a light emitting device of the invention.

FIG. 6 is a graph illustrating a beam angle distribution of a conventional light emitting device, and FIG. 7 is a graph illustrating a beam angle distribution of a light emitting device of the invention.

Referring to FIGS. 6 and 7, the dimensions marked along a circle represent angles of light radiated through the lens 100, and the dimensions marked vertically in the left represent light distribution according to the angles.

When a beam angle distribution was measured from the conventional light emitting device, as shown in FIG. 6, the light distribution showed very low values in a range from 0 to 10 degrees and from 170 to 180 degrees where light of the LED 20 is interfered by the LED package base 10. The light distribution showed highest values of 0.5 or more in a range approximately from 30 to 150 degrees. On the other hand, the light distribution showed relatively low values of 0.2 or less around the optical axis A or 90 degrees compared to the former ranges around 30 and 150 degrees.

When a beam angle distribution was measured from the light emitting device of the invention, as shown in FIG. 7, the light distribution also showed very low values in a range from 0 to 10 degrees and from 170 to 180 degrees as in the conventional light emitting device. However, the light distribution was uniform in a range approximately from 30 to 150 degrees. Thus, it can be understood that the light emitting device of the invention does not have a dark area around the optical axis A.

Accordingly, the light emitting device of the invention has some merits as follows: When the light emitting device is used for the purpose of lighting, light is not concentrated on a specific area. In application for a display unit, the user can easily identify light at any angles.

Figure 8:
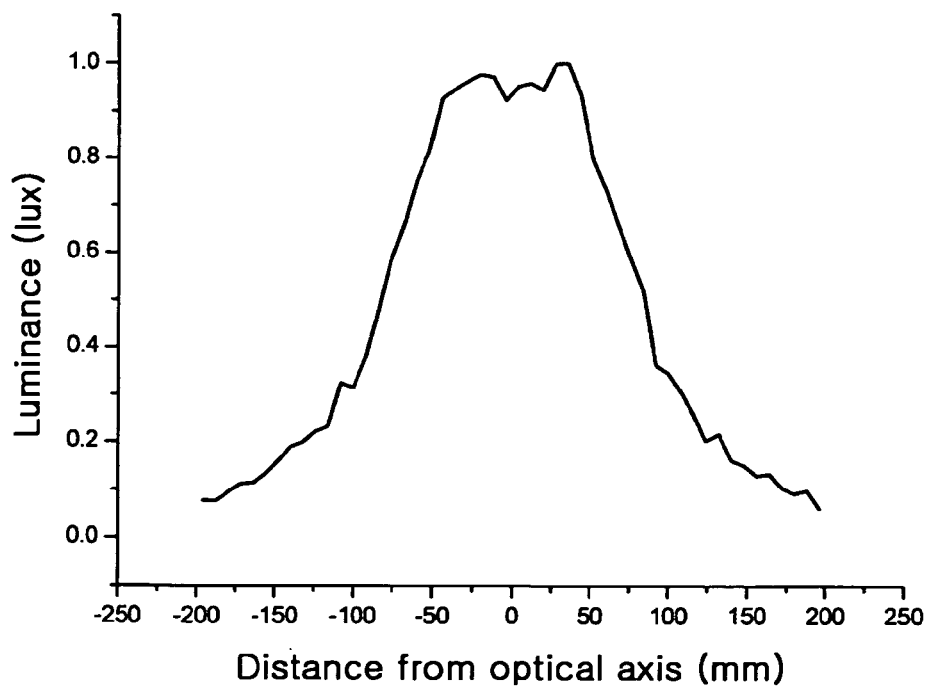
FIG. 8 is a graph illustrating a light distribution of a conventional light emitting device.
Figure 9:
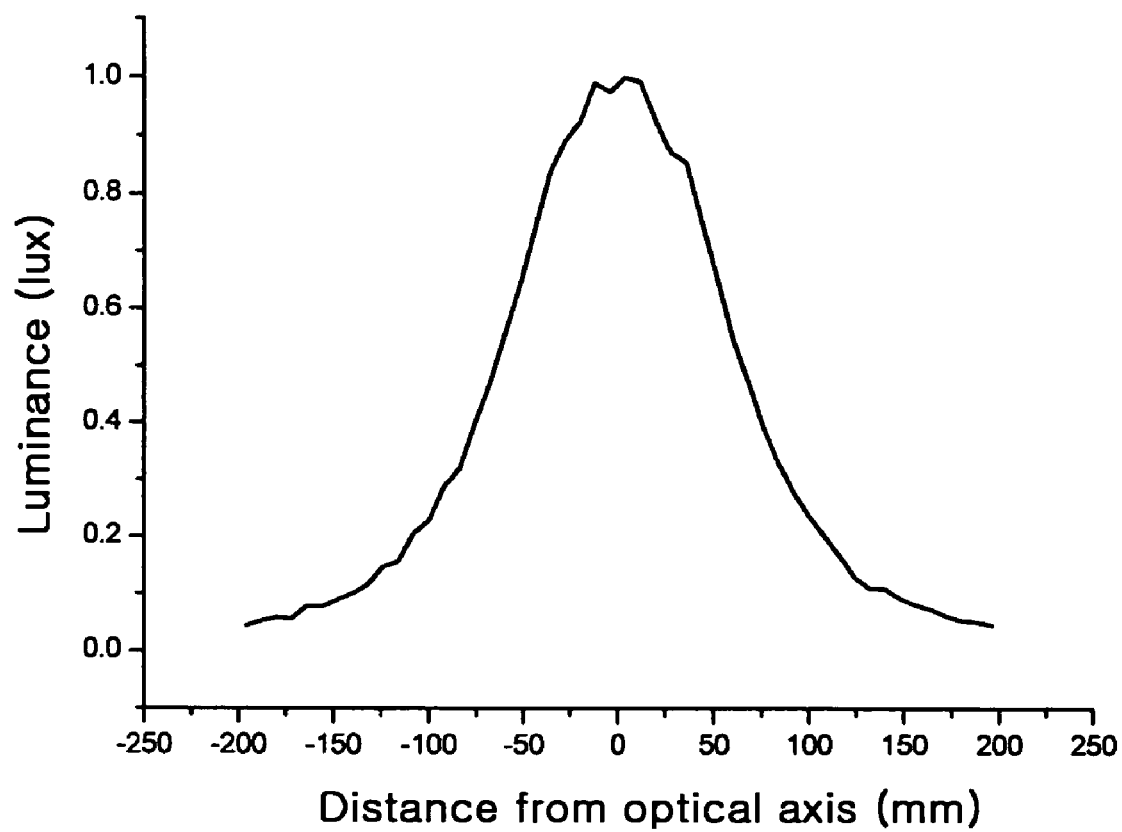
FIG. 9 is a graph illustrating a light distribution of a light emitting device of the invention.

FIG. 8 is a graph illustrating a light distribution of a conventional light emitting device, and FIG. 9 is a graph illustrating a light distribution of a light emitting device of the invention.

Referring to FIGS. 8 and 9, the graphs illustrate results of simulation performed to examine influences of lens geometry around the optical axis in which other conditions except for the lens 100 geometry were set equal and other surfaces except for around the optical axis A were covered with absorbers.

In case of the conventional light emitting device, it can be appreciated that light was spread wider but light quantity in a central region around the optical axis was reduced greatly than surrounding regions, thereby creating a dark area. On the contrary, in case of the light emitting device of the invention, it can be appreciated that light quantity was uniformly distributed without being reduced in a central region even though light spreading effect was reduced slightly.

Advantageously, the lens of the invention is configured to refract light beams falling onto the respective areas thereof at different angles, thereby producing a uniform light distribution within a specific lighting range, but not to create a dark area around an optical axis.

The use of the light emitting device of the invention can enhance lighting efficiency by preventing light from concentrating on a specific region and enhance display efficiency owing to light quantity uniform irrespective of angles.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

What is claimed is:

1. A lens comprising:
   a convex surface formed in an outer surface thereof facing away from a light source to uniformly distribute light emitted from the light source;
   a concave surface concaved inward from an inner region of said convex surface, around an optical axis; and
   a convex portion convexed outward from a central region of said concave surface, which the optical axis intersects, in order to enhance quantity of light around the optical axis; and
   wherein said lens comprises a planar geometry in a surface facing the light source.

2. The lens according to claim 1, wherein said convex portion comprises a spherical geometry.

3. The lens according to claim 1, wherein said convex portion has a diameter corresponding to 10% to 50% of that of said concave surface.

4. The lens according to claim 1, wherein said convex portion has a diameter corresponding to 2% to 20% of that of the lens.

5. The lens according to claim 1, wherein said convex portion has a focal length corresponding to 50% to 500% of a radius of curvature thereof.

6. The lens according to claim 1, wherein said convex portion has a peripheral region connected to said concave surface, said peripheral region having a radius of curvature in a concave direction in order not to form a boundary between the convex portion and the concave surface.

7. A light emitting device comprising:
- a light emitting diode package base where a light emitting diode is seated to act as a light source; and
- a lens attached to said light emitting diode package base to cover said light emitting diode,
- wherein said lens comprises a convex surface formed in an outer surface thereof facing away from a light source to uniformly distribute light emitted from the light source, a concave surface concaved inward from an inner region of said convex surface, around an optical axis, and a convex portion convexed outward from a central region of said concave surface, which the optical axis intersects, in order to enhance quantity of light around the optical axis, and wherein said lens comprises a planar geometry in a surface facing said light emitting diode.

8. The light emitting device according to claim 7, wherein said convex portion comprises a spherical geometry.

9. The light emitting device according to claim 7, wherein said convex portion has a diameter corresponding to 10% to 50% of that of said concave surface.

10. The light emitting device according to claim 7, wherein said convex portion has a diameter corresponding to 2% to 20% of that of the lens.

11. The light emitting device according to claim 7, wherein said convex portion has a focal length corresponding to 50% to 500% of a radius of curvature thereof.

12. The light emitting device according to claim 7, wherein said convex portion has a peripheral region connected to said concave surface, said peripheral region having a radius of curvature in a concave direction in order not to form a boundary between the convex portion and the concave surface.

* * * * *